US 6,527,263 B1

(12) United States Patent
Verbrugge

(10) Patent No.: US 6,527,263 B1
(45) Date of Patent: Mar. 4, 2003

(54) SHOCK ABSORBING TRANSPORT FRAME

(76) Inventor: Nick Verbrugge, 124 W. 4$^{th}$ St., Kanawha, IA (US) 50447

( * ) Notice: Subject to any disclaimer, the term of this patent is extended or adjusted under 35 U.S.C. 154(b) by 0 days.

(21) Appl. No.: 10/067,005

(22) Filed: Feb. 4, 2002

(51) Int. Cl.$^7$ .................................................. F16F 1/00
(52) U.S. Cl. ..................... 267/150; 267/259; 244/137.2
(58) Field of Search ................. 267/256, 259, 267/136, 131, 228, 217, 218, 64.16, 64.27, 64.25, 64.28, 113, 117, 118, 119, 150; 244/137.2, 118.6, 118.5, 137.1; 248/564

(56) References Cited

U.S. PATENT DOCUMENTS

| | | | |
|---|---|---|---|
| 3,630,565 A | | 12/1971 | Lehmann |
| 3,716,213 A | * | 2/1973 | Lacey .......................... 248/564 |
| 3,794,344 A | * | 2/1974 | Raidel .......................... 267/256 |
| 3,797,798 A | * | 3/1974 | Magruder et al. .......... 248/561 |
| 3,831,996 A | | 8/1974 | Layer |
| 3,966,223 A | * | 6/1976 | Carr .............................. 267/256 |
| 4,037,871 A | | 7/1977 | Bourgraf et al. |
| 4,378,128 A | | 3/1983 | Holling et al. |
| 4,623,289 A | | 11/1986 | Apostolos |
| 4,802,690 A | * | 2/1989 | Raidel ................. 280/124.157 |
| 5,016,862 A | | 5/1991 | Leyshon |
| 5,092,722 A | | 3/1992 | Reazer, III et al. |
| 5,205,601 A | | 4/1993 | Ferris |
| 5,230,528 A | * | 7/1993 | Van Raden et al. ... 280/124.116 |
| 5,253,853 A | * | 10/1993 | Conaway et al. ........... 248/564 |
| 5,494,386 A | | 2/1996 | Paull |
| 5,615,848 A | | 4/1997 | Ceriani |
| 5,651,585 A | * | 7/1997 | Van Duser .................. 248/585 |
| 5,730,414 A | | 3/1998 | Wenger et al. |
| 5,738,306 A | | 4/1998 | Moss et al. |
| 5,785,277 A | | 7/1998 | Manning et al. |
| 5,913,559 A | | 6/1999 | Sexton et al. |
| 6,024,528 A | | 2/2000 | Taylor |
| 6,220,587 B1 | * | 4/2001 | McKenzie et al. .......... 267/256 |

* cited by examiner

*Primary Examiner*—Christopher P. Schwartz
*Assistant Examiner*—Melanie Torres
(74) *Attorney, Agent, or Firm*—Daniel A. Rosenberg; Kent A. Herink; Davis Brown Law Firm

(57) ABSTRACT

A shock absorbing transport frame is provided. The frame comprises an inner frame and an outer frame capable of supporting a transportation device. The outer frame is secured to the inner frame in a manner that will control movement between the inner and outer frames. A four bar linkage operating between the inner and outer frame provides the movement control. The frame includes a pneumatic self-adjusting mechanism to maintain a constant gap between the inner and outer frame. The mechanism includes an air valve that adjusts air pressure to an air bag connected to the four bar linkage, wherein changes in the distance between the inner and outer frame create changes in the pressure to the air bag thereby exerting a counter acting force to return the inner and outer frame to a neutral position.

7 Claims, 5 Drawing Sheets

SHOCK ABSORBING TRANSPORT FRAME

BACKGROUND OF THE INVENTION

The present invention comprises a shock absorbing transport frame. In particular, a shock absorbing transport frame having an inner and outer frame connected in a manner that will dampen movement between the inner and outer frame through the utilization of a four bar linkage.

The use of transportation vehicles like ambulances for emergency transportation of injured patients to health care facilities comprises a necessary and standard practice across the world. The ability to quickly respond to medical emergencies save many lives, however, the transportation of patients to hospitals involves a certain amount of risk due to the translation of vertical and horizontal movement of the transportation vehicle to the patient usually supine on a gurney or stretcher inside the vehicle.

The resulting jostling of an injured patient can result in more than discomfort. In the cases of certain injuries that require complete immobilization, the sudden and irregular movement resulting from vehicle transportation can result in substantial additional impairment to the patient. Furthermore, the emergency vehicle often must travel at high speeds in order to quickly transport the patient to a medical facility for treatment, especially in the case of grave emergencies. The faster the vehicle travels the greater the intensity of vibration experienced by the patient.

Thus, a need exists for a transportation frame the better dampens oscillation and vibration from a transportation vehicle.

SUMMARY OF THE INVENTION

An object of the present invention comprises providing a shock absorbing transport frame.

These and other objects of the present invention will become apparent to those skilled in the art upon reference to the following specification, drawings, and claims.

The present invention intends to overcome the difficulties encountered heretofore. To that end, a shock absorbing transport frame is provided. The frame comprises an inner frame and an outer frame capable of supporting a transportation device. The outer frame is secured to the inner frame in a manner that will control movement between the inner and outer frames. A four bar linkage operating between the inner and outer frame provides the movement control.

DETAILED DESCRIPTION OF THE INVENTION

Figure 1:
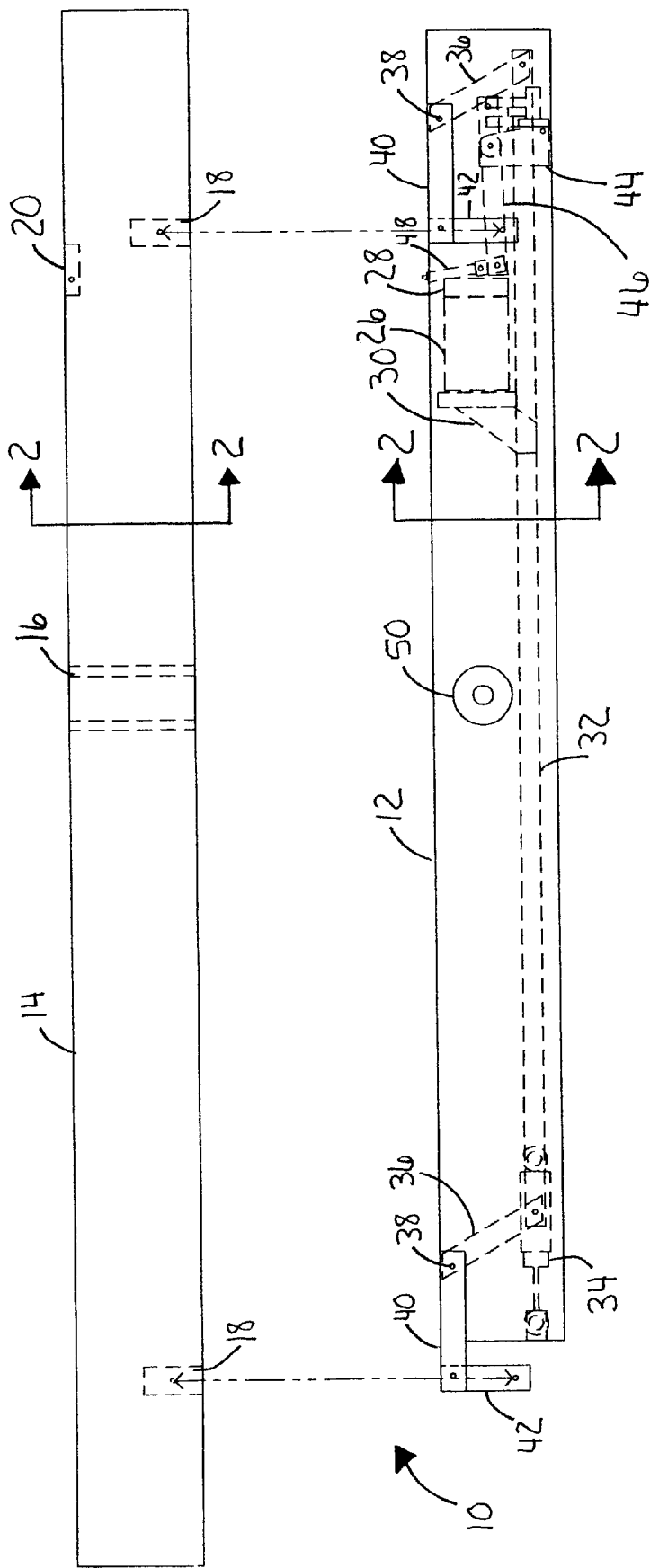
FIG. 1 is a side view of an inner and outer frame of a shock absorbing transport frame.
Figure 2:
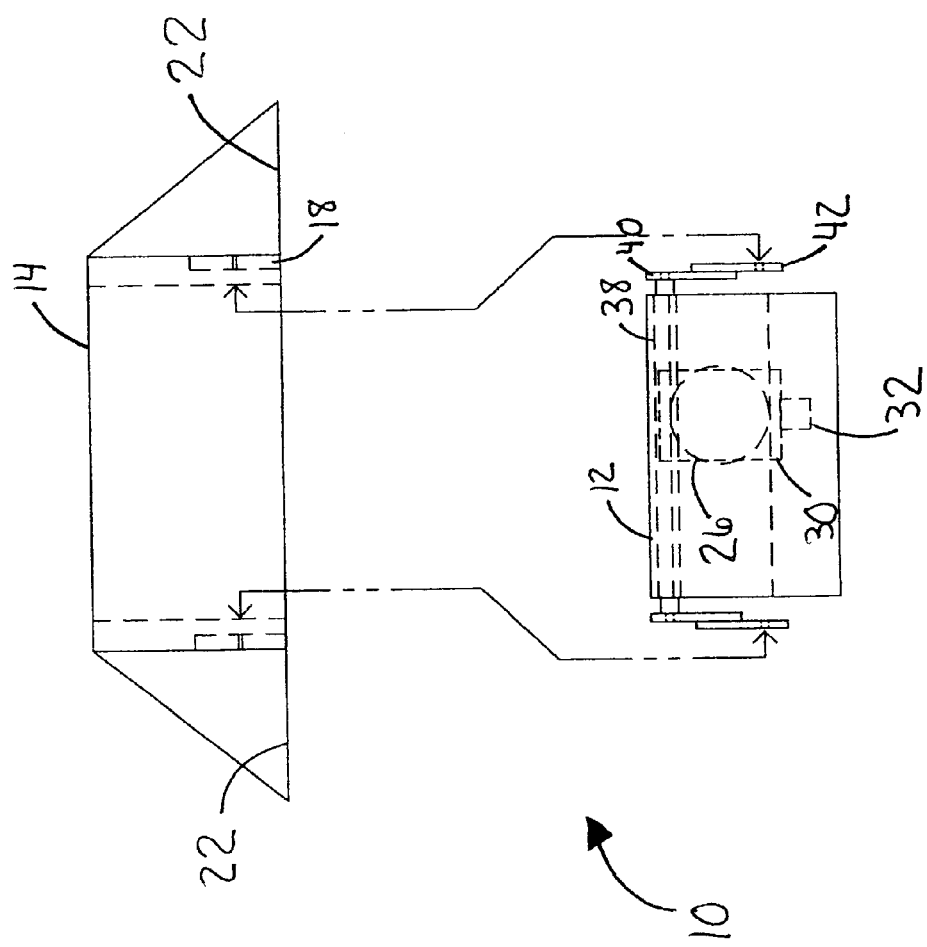
FIG. 2 is an end view of the inner and outer frame of FIG. 1 along the line 2—2 shown in FIG. 1.
Figure 3:
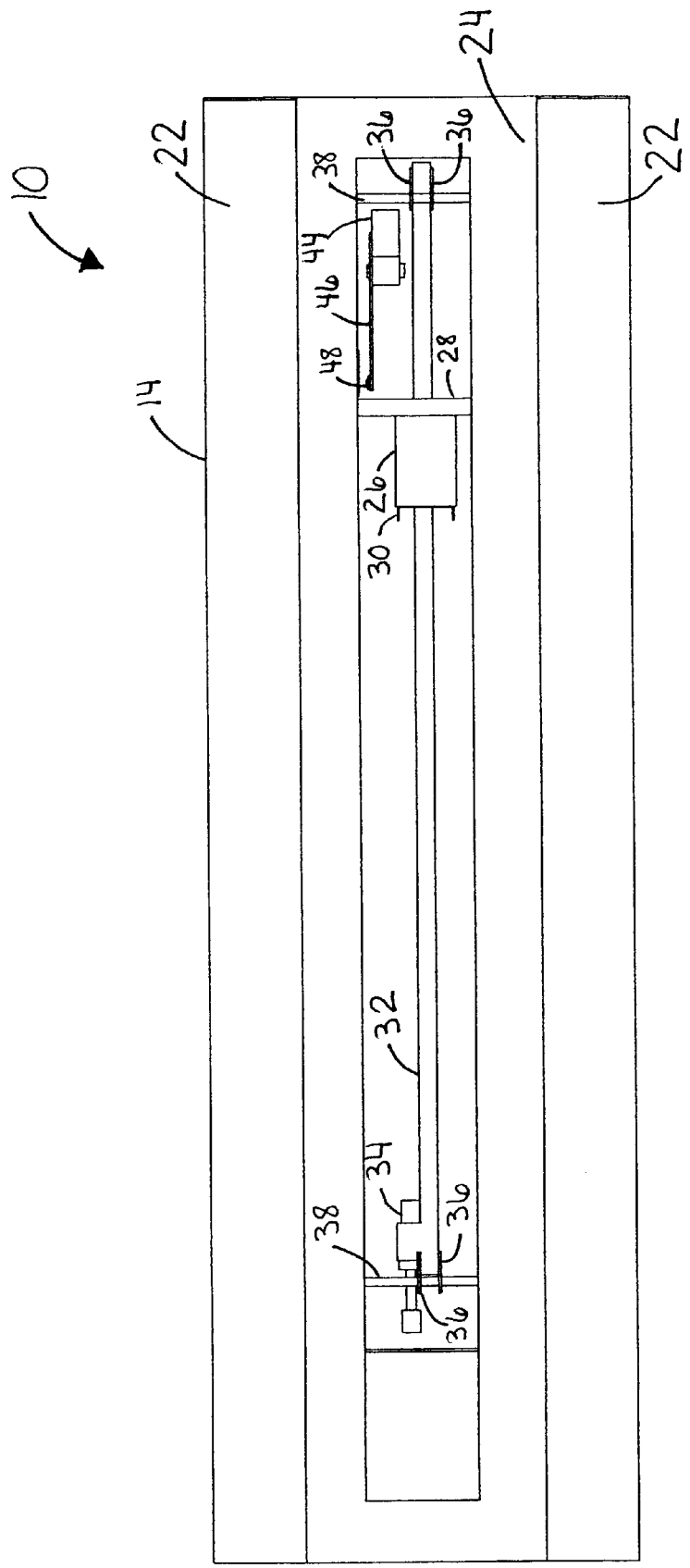
FIG. 3 is a top view of the shock absorbing transport frame with the outer frame attached to the inner frame.
Figure 4:
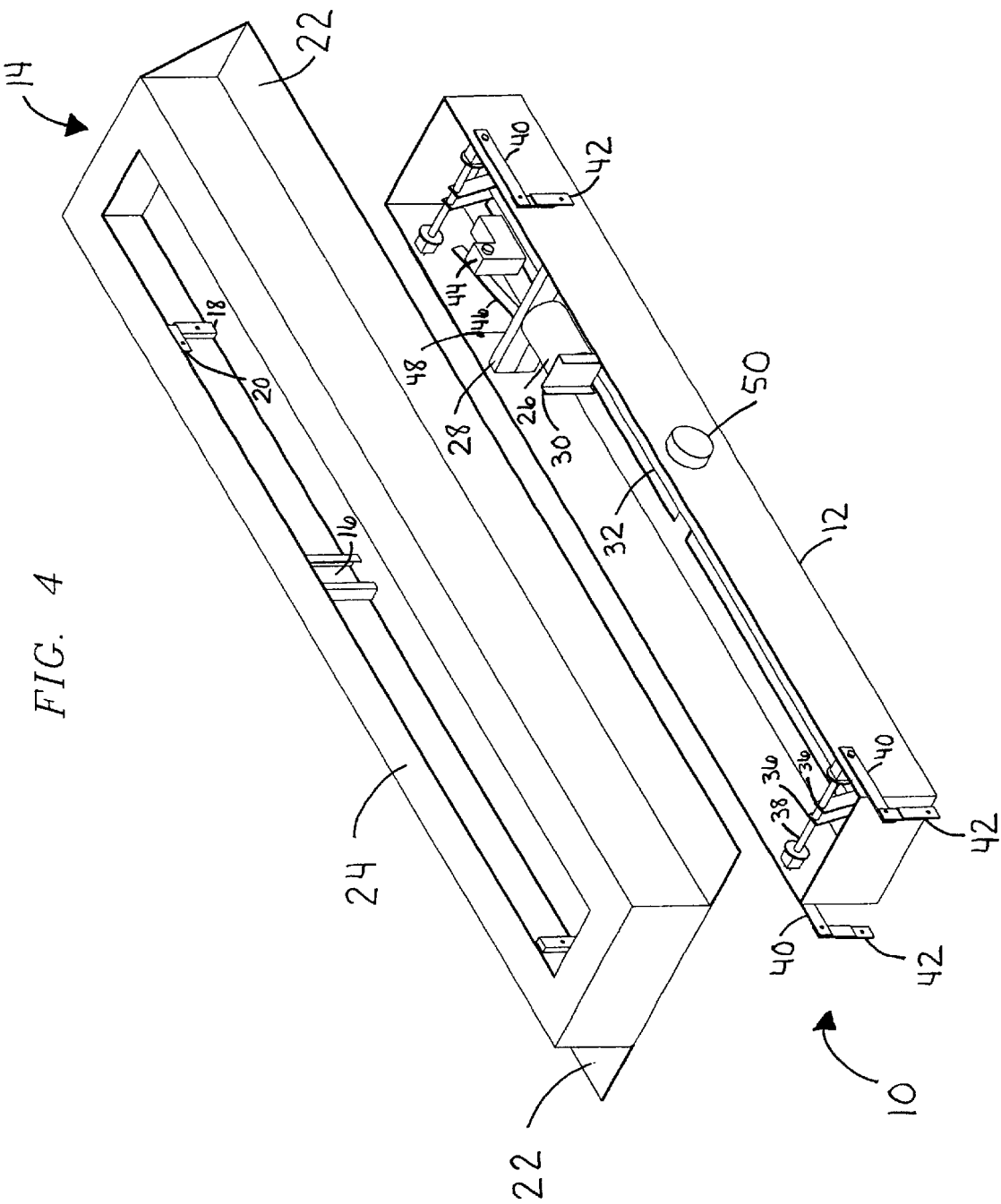
FIG. 4 is a perspective view of the inner and outer frame of the shock absorbing transport frame.
Figure 5:
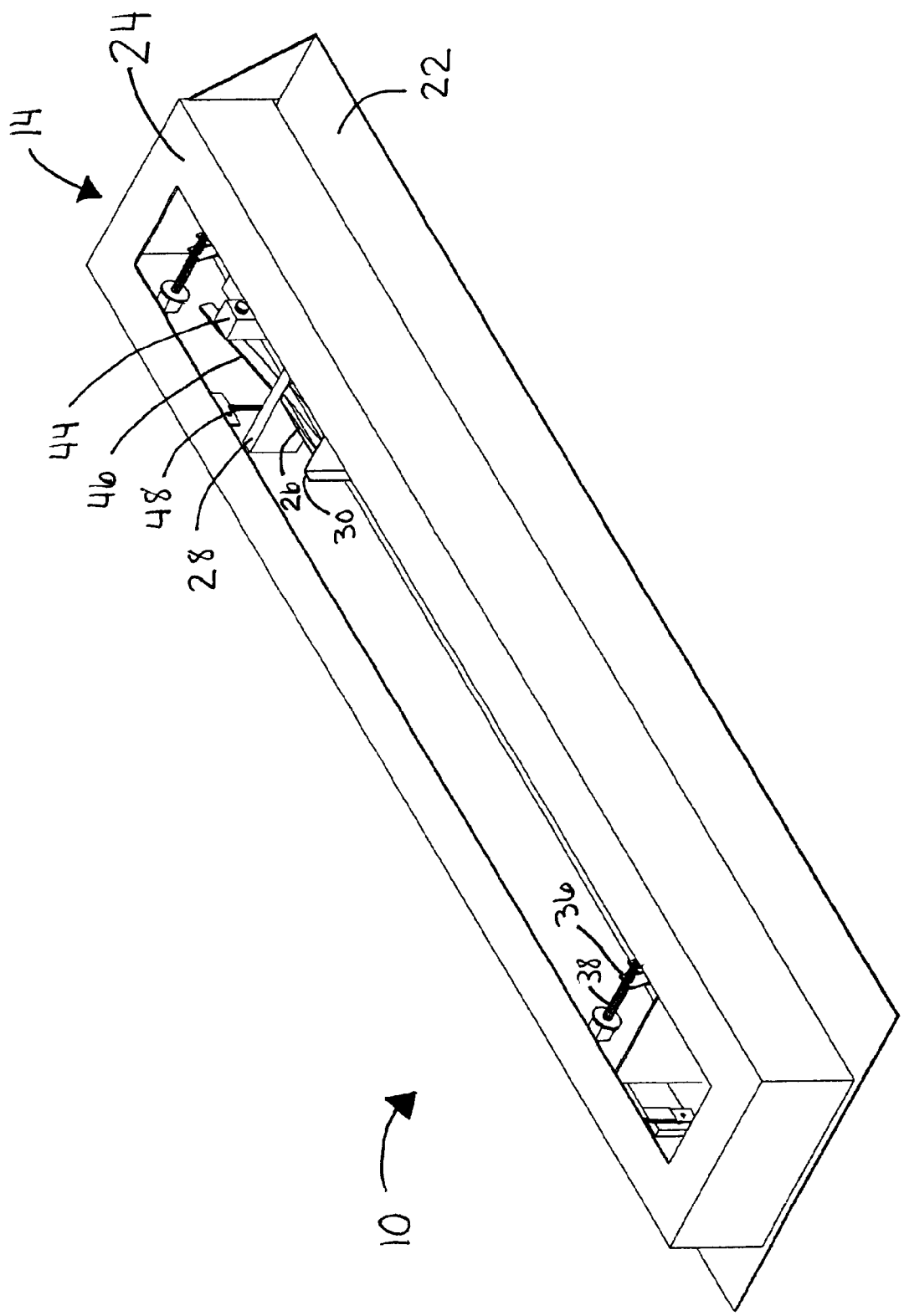
FIG. 5 is a perspective view of the shock absorbing transport frame with the outer frame attached to the inner frame.

In the figures, FIG. 1 shows a shock-absorbing transport frame 10. The transport frame 10 includes an inner frame 12 and an outer frame 14. In the preferred embodiment of the invention, the inner frame 12 was originally attached to the floor of a transportation vehicle (not shown) like an ambulance. The inner frame includes a generally rectangular shaped raised center box section 24 with flange skirts 22 extended from a lower portion of the center box 24 along its longitudinal axis (see FIGS. 3). This allows for securing the flange skirts 22 of the inner frame 12 to the transport vehicle. Additionally, the inner frame 12 is shaped such that it's adapted to support a gurney or stretcher type device when such a device is positioned in the transport vehicle. In the preferred embodiment of the invention, the transport vehicle is an ambulance.

The outer frame 14 of the transport frame 10 includes several connection points for attachment to the inner frame 12; these include link arm connectors 18, air valve link arm connector 20, and collar bracket 18. The outer frame 14 fits over the inner frame 12 such that guide bearings 50 attached to either side of the inner frame 12 secure within the collar brackets 16. The link arm connectors 18 secure to the second connector arms 42 of the inner frame 12 with bolts. In this manner, the inner frame 12 is nested inside the outer frame 14.

The inner frame 12 includes a pneumatically activated air bag 26 rigidly mounted to the inner frame 12 with air bag mount 28. Opposite to air bag mount 28, the air bag 26 is secured to an air bag link arm 30 that links the air bag 26 to an elongated shaft 32. The opposite ends of the elongated shaft 32 are connected to shaft bracket arms 36. The shaft bracket arms 36 are mounted to support posts 38 that secure to the inside of the inner frame 12. First connector arms 40 are secured to the outer ends of the support post 38, and second connector arms 42 extend generally downward from the end of the first connector arms 40 opposite to the end connected to the support post 38. Connected to one end of the elongated shaft 32 is a shock absorber 34.

The inner frame also includes a pneumatically activated air valve 44 connected to a first air valve link arm 46 that is in turn connected to a second air valve link arm 48. The second air valve link arm 48 secures to the air valve link arm connector on the outer frame 14.

In operation the outer frame 14 moves in relation to the inner frame 12 wherein that movement is cushioned or dampened by the combined effect of the shock absorber 34 and the air bag 26. The air valve 44 provides for a self-adjusting mechanism to maintain a constant gap between the inner and outer frame 12, 14 despite variations in the force applied either by vibration or oscillation of the transport vehicle or variations in the weight of a patient being transported. In particular, variable vertical force exerted upon the outer frame 14 is translated into movement of the first connector arms 40, second connector arms 42, and shaft bracket arms 36. These components maintain a rigid orientation with relationship to each other, but pivot through rotation of support posts 36. Moving in this manner, the vertical force applied to the outer frame 14 causes movement of the elongated shaft 32 that is dampened by the shock absorber 34.

Thus, the elongated shaft 32, the outer frame 14, and the linkage connecting the two form a four bar linkage that move together in response to variable pressures exerted on the inner and outer frames 12, 14. The variable force can results from movement of the underlying transportation vehicle, or from changes in the weight of a patient being transported.

The air bag 26 and air valve 44 are in operable communication with a 12-volt air compressor (not shown) to provide a self-adjusting mechanism to adjust the position of the outer frame 14 relative to the inner frame 12 to maintain a constant distance between the frames 12, 14. An air line (not shown) pneumatically connects the air valve 44 to the air compressor, and second air line (not shown) pneumatically connects the air valve 44 to the air bag 26. In this manner, the system acts to return the frames 12, 14 to a neutral position relative to each other. In particular, variations in load will cause vertical movement of the outer frame 14 that will move the first air valve link arm 46 and the second air valve link arm 48. This movement will trigger the air valve 44 to adjust the air pressure in the air bag 26 coming from the air compressor. This adjustment of air pressure in the air bag 26 will act to return the inner and outer frames 12, 14 back to the neutral position.

Moreover, downward vertical movement of the outer frame 14 will move the four bar linkage such that the elongated shaft 32 moves to right as seen in FIG. 1, this will compress the air bag 26 and move the first air valve link arm 46 and the second air valve link arm 48 downward thereby triggering the air valve to increase the air pressure to the air bag 26. The air pressure increases until movement of the four bar linkage and first air valve link arm 46 and the second air valve link arm 48 reverses, thereby returning the inner and outer frames 12, 14 to a neutral position. Of course, upward vertical movement of the outer frame 14 will result in a similar compensation effect, with the movements and adjustments reversed. The shock absorber 34 will continue to exert a dampening effect during the self-adjusting process, as well as acting generally to dampen vibration and oscillation coming from the transportation vehicle.

The second air valve link arm 48 includes a two piece threaded shaft that adjusts. Turning the pieces of the arm 48 in one direction will lengthen the arm 48, and turning it in the other direction will shorten the arm. The neutral position between the inner and outer frames 12, 14 is adjusted in this manner.

In this manner, the shock absorbing transport frame 10 provides for self-compensating shock absorption in response to movement of a gurney or stretcher-type device placed upon the outer frame 14, when the frame 10 is affixed inside a transport vehicle like an ambulance. Thus, in the ambulance application, sudden and erratic movement common to moving vehicles along with variation in patient weight is compensated for in a manner that protects the patient and provided for a more comfortable, cushioned, and safer ride during transportation.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A shock absorbing transport frame, said frame comprising:
   an inner frame;
   an outer frame capable of supporting a transportation device, and secured to said inner frame in a manner that will control movement between said inner and outer frames;
   wherein said movement control is provided by a four bar linkage operating between said inner and outer frame, and wherein said four bar linkage includes said outer frame, an elongated shaft in said inner frame substantially parallel to said outer frame, and pivotable linkage connecting said outer frame and said elongated shaft at either ends, and
   wherein said pivotable linkage comprises a rotatable support post connected to said inner frame, a shaft bracket arm rigidly connected to said support post and pivotable connected to said elongated shaft, a first and a second connector arms rigidly connected to said support post, to each other, and to said outer frame.

2. The invention in accordance with claim 1 further comprising an air valve and wherein said pivotable linkage is between said air valve and said outer frame, an air bag in pneumatic communication with said air valve and connected to said elongated shaft wherein compression or expansion of said air bag moves said elongated shaft, and an air compressor for providing a steady source of pressurized air to said air valve, wherein vertical movement of said outer frame relative to said inner frame moves said pivotable linkage causing said air valve to adjust air pressure to said air bag thereby causing said elongated shaft to move in a manner that returns said outer and inner frames to a neutral position.

3. The invention in accordance with claim 1 further comprising a shock absorber mounted to said elongated shaft for dampening effect.

4. The invention in accordance with claim 1 wherein said inner frame further comprises a guide bearing and said outer frame further comprises a collar bracket for containing said guide bearing in a manner that allows for vertical movement between said outer and inner frames.

5. The invention in accordance with claim 1 wherein said transportation device is a stretcher.

6. The invention in accordance with claim 1 wherein said inner frame is rigidly attached to the bed of an ambulance.

7. A shock absorbing transport frame, said frame comprising:
   an inner frame with a guide bearing mounted to the bed of an ambulance;
   an outer frame capable of supporting a stretcher;
   a collar bracket in said outer frame for containing said guide bearing of said inner frame in a manner that allows for vertical movement between said outer and inner frames;
   a four bar linkage operating between said inner and outer frame, comprising:
      said outer frame;
      an elongated shaft in said inner frame substantially parallel to said outer frame with a shock absorber connected to said elongated shaft and said inner frame for dampening effect; and
      pivotable linkage connecting said outer frame and said elongated shaft at either ends said pivotable linkage comprising a rotatable support post connected to said inner frame, a shaft bracket arm rigidly connected to said support post and pivotable connected to said elongated shaft, a first and a second connector arm rigidly connected to said support post, rigidly connected to each other, and rigidly connected to said outer frame;

an air valve and pivotable linkage between said air valve and said outer frame;

an air bag in pneumatic communication with said air valve and connected to said elongated shaft of said four bar linkage wherein compression or expansion of said air bag moves said elongated shaft;

an air compressor for providing a steady source of pressurized air to said air valve; and wherein vertical movement of said outer frame relative to said inner frame moves said pivotable linkage connecting said outer frame and said air valve causing said air valve to adjust air pressure to said air bag thereby causing said elongated shaft of said four bar linkage to move in a manner that returns said outer and inner frames to a neutral position.

* * * * *